US009106726B2

(12) United States Patent
Davis et al.

(10) Patent No.: US 9,106,726 B2
(45) Date of Patent: Aug. 11, 2015

(54) METHOD AND SYSTEM FOR PROVISIONING PACKETIZED VOICE COMMUNICATION SERVICES

(75) Inventors: Brent H. Davis, Wylie, TX (US); Michael Hilden, Richardson, TX (US); John Evans, Plano, TX (US); Jennifer Wang, Dallas, TX (US); Travis Behrens, Collinsville, OK (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 339 days.

(21) Appl. No.: 12/904,716

(22) Filed: Oct. 14, 2010

(65) Prior Publication Data
US 2012/0096051 A1 Apr. 19, 2012

(51) Int. Cl.
*G06F 17/30* (2006.01)
*H04M 7/00* (2006.01)
*H04L 12/24* (2006.01)
*H04L 29/12* (2006.01)
*H04L 29/08* (2006.01)

(52) U.S. Cl.
CPC ......... *H04M 7/0087* (2013.01); *H04L 41/0806* (2013.01); *H04L 41/22* (2013.01); *H04L 61/1511* (2013.01); *H04L 61/1541* (2013.01); *H04L 67/1002* (2013.01)

(58) Field of Classification Search
CPC ............... H04L 29/12066; H04L 61/1511; H04L 67/1002; H04L 41/22; H04L 41/0806; H04L 61/1541; H04M 7/0087
USPC ............... 370/352; 709/220–226, 245
See application file for complete search history.

(56) References Cited

U.S. PATENT DOCUMENTS

| 7,343,586 | B1* | 3/2008 | Hernandez, III | 717/124 |
|---|---|---|---|---|
| 7,805,379 | B1* | 9/2010 | Adkins et al. | 705/307 |
| 2001/0039543 | A1* | 11/2001 | Mann et al. | 707/3 |
| 2005/0193076 | A1* | 9/2005 | Flury et al. | 709/206 |
| 2006/0129665 | A1* | 6/2006 | Toebes et al. | 709/223 |
| 2007/0061397 | A1* | 3/2007 | Gregorat et al. | 709/203 |
| 2009/0285199 | A1* | 11/2009 | Strahs et al. | 370/352 |
| 2010/0030914 | A1* | 2/2010 | Sparks et al. | 709/235 |

OTHER PUBLICATIONS

NTC Hosting, "How to Add a Custom SRV Record to a domain or subdomain", avail. at http://www.youtube.com/watch?v=Sbqaj1RYa9w, Apr. 3, 2009, see enclosed screen shot as proof of publication date.*
NTC Hosting, "DNS Management", http://www.ntchosting.com/dns/dns-management.html, archived on Apr. 5, 2010.*

* cited by examiner

*Primary Examiner* — Khaled Kassim
*Assistant Examiner* — Zhaohui Yang (57) ABSTRACT

An approach for enabling a customer to provision resources of a packetized voice service provider based on one or more customer conditions is described. A provision management platform receives a request for provisioning a domain name service as part of packetized voice service. In response to the request, the provision management platform prompts via a graphical user interface to obtain information for populating a service record of the domain name service. The provision management platform then generates the service record for storage corresponding to a customer account for the packetized voice service.

18 Claims, 9 Drawing Sheets

METHOD AND SYSTEM FOR PROVISIONING PACKETIZED VOICE COMMUNICATION SERVICES

BACKGROUND INFORMATION

Packetized voice communication services such as Voice Over Internet Protocol (VoIP) is increasingly popular among communication and telephony providers, including wholesalers that are responsible for providing solutions to their business customers. Because of the bandwidth efficiency and low costs that VoIP technology can provide, more businesses are migrating from traditional copper-wire telephone systems to VoIP to reduce their monthly phone costs. VoIP communication protocols enable services such as voice transmission, facsimile, e-mail and voice messaging to be facilitated via the Internet rather than a standard public switched telephone network (PSTN). As the demand for VoIP continues to grow, telecommunication service providers must be able to readily provision network resources, including broadband servers, IP telephony gateways, software and other equipment for enabling packetized voice communication on demand. When the provider or wholesaler's existing network infrastructure is not sufficient to meet demand, they may optionally acquire resources from a packetized voice communication solutions provider (e.g., as a third-party solution). Typically, the solution provider's infrastructure is more expansive and thus configured to accommodate multiple individual service providers or wholesalers simultaneously.

Unfortunately, as the demand for the network resources of the solution provider grows, delays in the provisioning of resources among the various requesting service providers or wholesalers may occur. When the demand on the solution provider's system and network resources results in a load sharing or failover condition, availability and sustainability of resources for the benefit of a requesting customer is compromised.

Based on the foregoing, there is a need for effective, scalable provisioning of the resources of a packetized voice service for use by a requesting customer.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for enabling a customer to provision resources of a packetized voice service based on one or more customer conditions is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the various exemplary embodiments are described with respect to packetized voice services utilized an Internet Protocol (IP)-based approach (e.g., Voice Over Internet Protocol based systems and/or software), it is contemplated that these embodiments have applicability to any data protocols, methodologies or systems for use over a web-based network (e.g., the Internet) in facilitating voice data transmission, computer based phone communication, Internet protocol (IP) telephony, Internet telephony, voice over broadband (VoBB), broadband telephony, broadband phone and the like.

Figure 1:
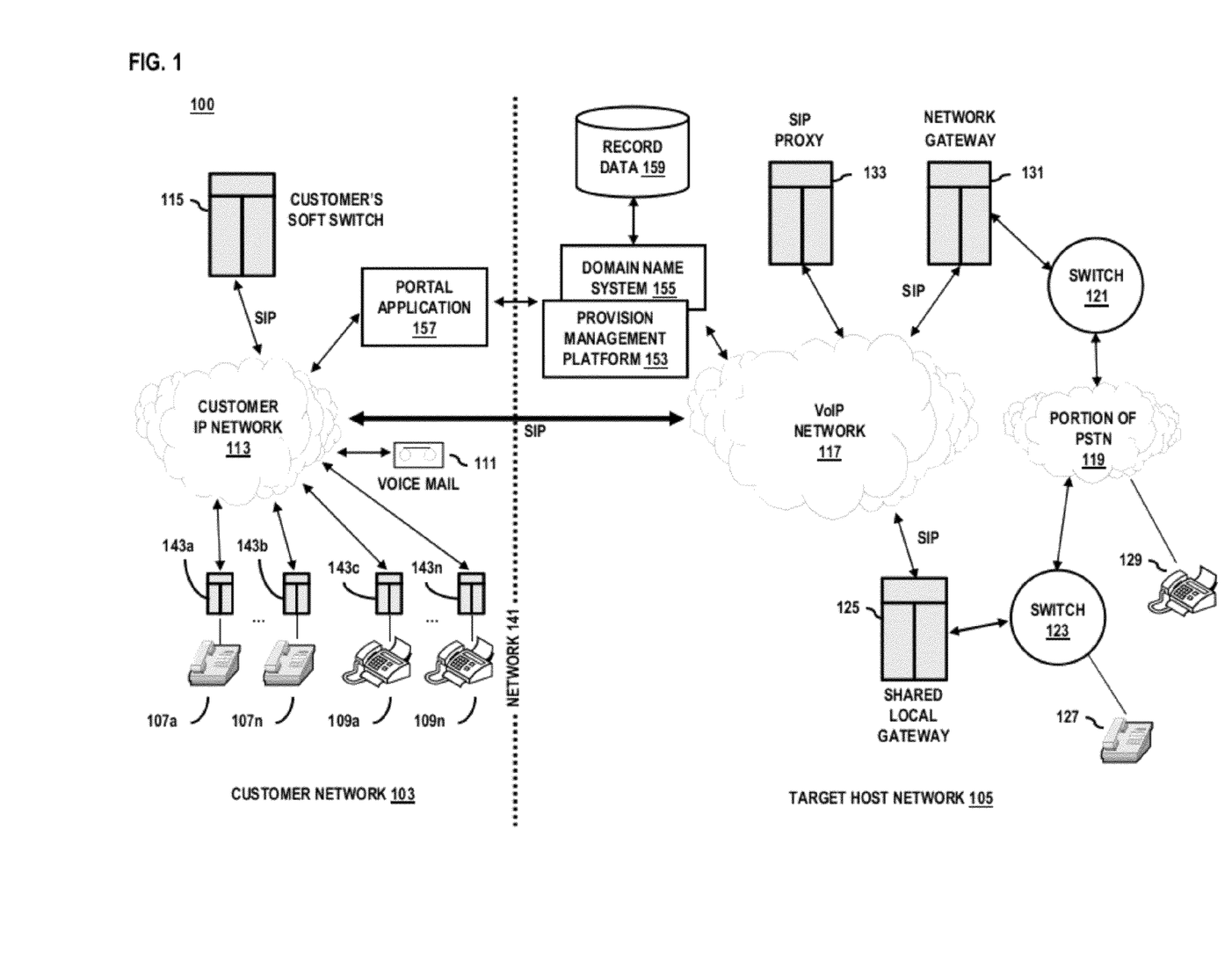
FIG. 1 is a diagram of a system for enabling a customer to provision resources of a packetized voice service solution provider based on one or more conditions, according to one embodiment.

FIG. 1 is a diagram of a system for enabling a customer to provision resources of a packetized voice service solution provider based on one or more conditions, according to one embodiment. System 100 includes a customer network 103, encompassing various resources for enabling facilitation of voice/telephone communication services. In addition, system 100 includes a target host network 105 that interacts with the customer network 103 by way of a communication and/or network link 141. The target host network 105 also encompasses various resources for enabling voice/telephone and/or multimedia communication services. By way of example, the customer network 103, under this scenario, may be implemented by a communication services provider/wholesaler as an infrastructure for supporting operation of various telephone nodes 107a-107n, facsimile devices 109a-109n, a voice messaging service 111 and other solutions. In the case of a wholesaler, the communication services are intended for deployment by various business customers as opposed to residential or private users. Deployment of communication services may include the provisioning and/or measured allocation of resources, e.g., a customer soft switch 115 associated with the customer IP network 113, as units of use and access to support telephony applications. This is represented, by way of example with respect to resource units 143a-143n, deployed for enabling telephone systems 107a-107n and facsimile devices (fax machines) 109a-109n.

The infrastructure/customer network 103 for deploying telecommunication services is facilitated by way of an IP network 113, i.e., a local area network (LAN), wide area network (WAN), enterprise network or other private address space for facilitating broadband or Internet based communication. While not shown expressly, the IP network 113 may encompass various servers, routers, proxy systems, gateway devices, software utilities, etc. interconnected to facilitate data communication. In addition, the customer network 103 includes a soft switch 115 that is configured to the IP network 113. The soft switch 115 is a centralized service and/or device for connecting telephone calls from one phone device 107a or facsimile device 109a to another by way of computer software as opposed to hardware (e.g., via switchboards for performing call routing). While implementations vary, it is noted that the soft switch 115 may be configured to execute with respect to the Public Switched Telephone Network (PSTN) or other communication channel. Still further, it is noted that for multimedia communication services as provided by the customer network 103, the soft switch 117 may act as an access gateway control function (AGCF). Any implementation, including that for supporting IP based communication, is applicable with respect to the exemplary techniques and systems presented herein.

The target host network 105 is, by way of example, a communication services infrastructure maintained by a packetized voice communication service solution provider. As mentioned, the customer network 103 may interact with the target host network 105 for accessing additional communication services and/or resources, for extending its existing network 103 capacities or the like. Under this scenario, the target host network 105 serves as a third party IP based communication resource for use by the telecommunication service provider/wholesaler. Access to the target host network 105 may be permitted on the basis of a service agreement or other like arrangement such that the service provider/wholesaler associated with the customer network 103 is a customer of the solution provider associated with the target host network 105. As will be discussed in greater detail with respect to FIG. 2, a provision management platform 153 may be leveraged by a user of the customer network 103 for accessing, provisioning and deploying resources of the target host network 105 in response to specific needs.

In certain embodiments, "packetized voice communication" pertains to a family of methodologies, communication protocols and transmission technologies for delivery of voice data and multimedia sessions over Internet Protocol (IP) networks, such as the Internet. One form of packetized voice communication known as Voice Over Internet Protocol (VoIP), i.e., as provided by the target host (service provider), is implemented via a VoIP network 117. The VoIP network 117 may encompass various servers, routers, proxy systems, gateway devices, software utilities, etc. for enabling transmission of voice and multimedia data packets for IP processing and abstraction. For instance, a shared local gateway 125 may be associated with the VoIP network 117 for interconnecting a local/private switching device 123 of the public switched telephone network (PSTN) or plain old telephone service (POTS) with the VoIP network 117. The switching device 123 provisions, manages, connects and routes phone calls placed by the various telephones 127, facsimile devices 129, etc. operable over the PSTN. In the case of a local/private switching device 123, the switching device may be implemented as a Private Branch Exchange (PBX) or business-level switch. The portion of the PSTN 119 of which the target host network 105 is joined may include telephone lines, fiber optic cables, microwave transmission links, cellular networks, communications satellites and undersea telephone cables inter-connected by various switching centers.

A network gateway 131 may also be associated with the VoIP network 117 for interconnecting another switching device 121 of the PSTN 119. The network gateway 131 may be configured to perform network level protocol conversions for enabling interconnection between the PSTN 119 and the VoIP network 117. In addition, a session initiation protocol (SIP) proxy server 133 is associated with the VoIP network 117 for routing requests to a telephone 127, fax machine 129 or device, authenticating and authorizing use of network services, implementing solution provider (target host) call-routing policies and providing various communication or data features. The SIP proxy 133 utilizes the session initiation protocol, which is an application-layer control and signaling protocol for enabling Internet Telephony applications—i.e., sessions for audio/videoconferencing, interactive gaming, etc. In addition to user authentication, redirect and registration, through use of SIP, the SIP proxy 133 supports traditional telephony features such as personal mobility, time-of-day routing and call forwarding based on the geographical location of the person being called.

It is noted that for telecommunication infrastructures such as the target host network 105, the SIP proxy 133 may be a component of an IP Protocol Private Exchange Branch (IP-PBX), which is a type of telephone switch that supports VoIP applications. An IPPBX provides services similar to traditional private branch exchanges (PBX) services, but over data networks like a local area network (LAN) or wide area network (WAN) rather than circuit-switched networks. IPPBX typically can switch calls between VoIP on local lines or between VoIP and traditional telephone 127 or fax machine 129 users in the same way a PBX configured to a PSTN does. For example, SIP may be implemented for connecting the network gateway 131 and shared local gateway 125 of the target host network 105. SIP may also be implemented in the customer network 103, by way of an SIP based soft switch 115, for connection with the customer IP network 113. Hence, SIP may be enabled by way of a proxy 133 or switch 115, for facilitating packetized transmission of voice and multimedia as well as for suitably processing and routing calls originating from a telephone 127 or fax machine 129 configured to a PSTN 119, IP based network 113/117, or combination thereof.

In various embodiments, it is noted that IP protocols may be employed for both the customer network 105 and target host network 107 for implementation of the customer IP network 113 and VoIP network 117 respectively. Exemplary IP protocols may include IP version 4 (IPv4), IP version 6 (IPv6), Internet Control Message Protocol (ICMP), ICMP version 6 (ICMPv6), Internet Group Management Protocol (IGMP) and any other known or still developing protocols. Also, in certain embodiments, network 113 and 117 may be any suitable wireline and/or wireless network, and be managed by one or more service providers. For example, in addition to a PSTN, network 113 and 117 may include an integrated services digital network (ISDN) or other like network. In the case of a wireless network configuration, networks 113 and 117 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, networks 117-119 may be completely or partially contained within one another, or may embody one or more of the aforementioned infrastructures. It is further contemplated that networks 113 and 117 may include components and facilities to provide for signaling and/or bearer communications between the various components or facilities of system 100. In this manner, they may embody or include portions of a signaling system 7 (SS7) network, or other suitable infrastructure to support control and signaling functions.

Because of the bandwidth efficiency and low cost of packetized voice communication technology (e.g., VoIP), more businesses are employing it as an alternative to typical copper-wire telephone systems. Telecommunication service providers, including wholesalers that cater specifically to businesses and organizations, must be able to readily provision their network resources 103 to meet growing demand. Unfortunately, expansion of the customer base beyond the current network 103 capacity of the service provider or wholesaler necessitates additional capital expenditure to expand their network 103, including the purchase of broadband servers, IP telephony gateways, software and other equipment. This is particularly challenging for smaller providers and wholesalers. Also, those new to providing packetized voice communication as an alternative to PSTN phone services may not have the expertise, flexibility and existing infrastructure necessary to support increased customer demand. When a provider/wholesaler's network 103 is limited, they may rely on the resources of a target host network 105, i.e., a third party solution VoIP solution provider, to meet growing customer demand. Hence, the ability of the target host network 105 to accommodate, share and deploy network resources for use by the customer network 103 is critical. This requires the effective management of conditions that may delay deployment and provisioning of resources by the target host network 105, including load sharing, failover and other conditions.

In certain embodiments, "load sharing" pertains to the means by which a network, encompassing various computing devices, servers, data processors, software and other components interact with one another to share, distribute and balance limited processing, network and database resources in response to demand. By way of example, load sharing may be performed so that no single device of the network 105 is overwhelmed. In response to failure (e.g., excessive overload, ineffective load balancing, etc.), be it temporary or permanent, the target host network 105 may also execute failover. In certain embodiments, "failover" pertains to a backup operation that automatically switches to a standby database, server, entirely different network or any other resource if the primary system or network 105 fails or is temporarily shut down due to error conditions being met. Supporting the demands of multiple different service providers or wholesalers requires effective management of load sharing or failover conditions at the target host network 105. Unfortunately, service providers and wholesalers do not have a means of readily provision the resources of a target host network 105 on demand or by design, regardless of the network conditions of the target host network 105.

To address this issue, system 100 presents a provision management platform 153 configured to provision resources of a target host network 105 on demand, such as in response to a detected failover, load sharing or other condition. By way of example, the provision management platform 153 provides a user interface that may be accessed through a portal application 157 (e.g., web browser) of the customer for controlling an extent of access to the VoIP network 117 of the target host network 105 and its various interconnected devices and/or services. Under this scenario, a point-of-access device to the target host network 105 is implemented in the form of a domain name system/service (DNS), which may be implemented as a primary access server. In certain embodiments, a "domain name service (DNS)" pertains to a system for naming computers and network services that are organized into a hierarchy of domains (e.g., IP addresses) within the target host network 105. DNS naming is used in IP based networks, such as the Internet, to locate computers and services through user-friendly names. Hence, when a user specifies a DNS name in an application, such as a web browser or portal application 157, DNS 155 resolves the name to other information associated with the name, such as network address (e.g., IP address). By way of example, when a user enters a user friendly name into a portal application 157 such as www.example_resource.com, this name is mapped to the numeric IP address equivalent for referencing the particular network computer, device or resource of interest.

Records containing data regarding the various resources of the target host network 105, including a domain name specification, is maintained as a service record in a record database 159. A service record, also referred to as a SRV record, in certain embodiments pertains to a specification of data in the DNS 155 defining the location, i.e. the hostname and port number of servers for specified services, priority data, data packaging instructions, etc. The service record is generated in accordance with a specific data structure having defined data types, and is further maintained as a text file, script file or other file type by the DNS 155. It is noted that a user's (customer's) ability to access resources of the target host network 105, such as the network gateway 141, local gateway 125, affiliated resources of the PSTN 119 and other resources configured to the VoIP network 117, is dependent upon their ability to name specific resources of interest. Hence, the user's ability to retrieve, edit, delete or create new service records dictates how said resources are provisioned. Access to resources may be established by way of a user account/registration process as established with the solution provider. Further, it is noted that processing of service records by the DNS 155 directly impacts resource provisioning to a given user.

Figure 2:
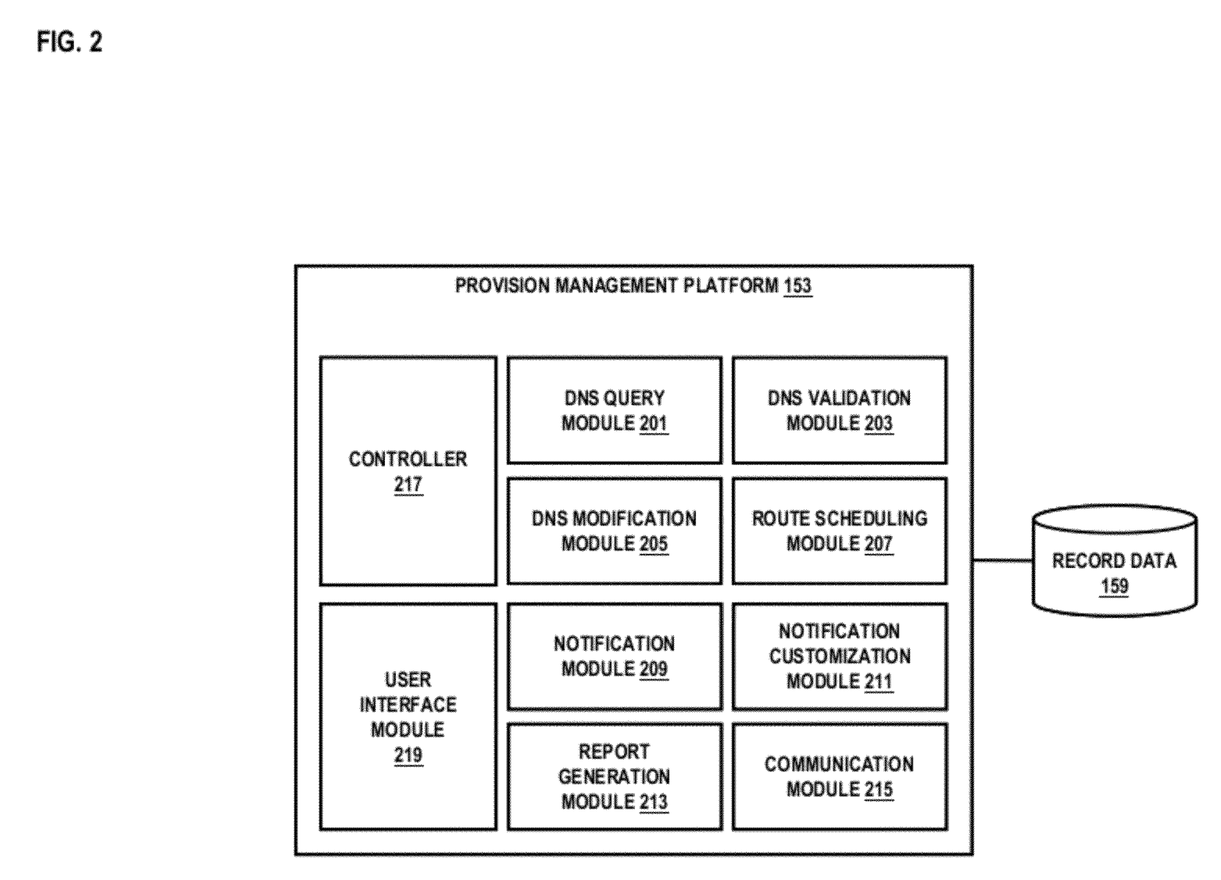
FIG. 2 is a diagram of a provision management platform for enabling a customer to provision resources of a packetized voice service solution provider based on one or more conditions, according to one embodiment.

FIG. 2 is a diagram of a provision management platform for enabling a customer to provision resources of a packetized voice service solution provider based on one or more conditions, according to one embodiment. The provision management platform 153 includes various executable modules for performing one or more computing, data processing and network based instructions that in combination provide a means of enabling the provisioning of resources of a packetized voice communication solution provider. Such modules can be implemented in hardware, firmware, software, or a combination thereof. By way of example, the provision management platform 153 may include a DNS query module 201, DNS validation module 203, DNS modification module 205, route scheduling module 207, notification module 209, notification customization module 211, report generation module 213, communication module 215, controller 217 and user interface module 219. In addition, the provision management platform 153 also accesses service record data from a record database 159, the record database being maintained in conjunction with a DNS 155 for defining one or more resources of the packetized voice communication solution provider (at the target host network 105). It is noted that a requesting customer interacts with and manages the provision management platform 153 by way of a portal application 157 to affect DNS 155 provisioning and control of resources of the target host network 105.

As mentioned above, in one embodiment the user interface module 219 enables presentment of a graphical user interface of a customer computing device. By way of example, the user interface module 219 generates a user interface in response to APIs or other function calls corresponding to the web portal application 157 (e.g., Internet browser) of the computing device for enabling display of graphical and textual elements. It is noted the user interface is generated to enable customer entry of service record data, i.e., the domain name of a specific resource. Further, the interface features various controls and input fields for enabling modification of data records for affecting operation of the DNS 155. In one embodiment, a communication module 215 enables formation of a session over a network 141 between the provision management platform 153 and the portal application 157 for execution of the user interface. Various protocols and data sharing techniques for enabling collaborative execution between a customer computing device (e.g., mobile devices, laptops, Smartphones, tablet computers, desktop computers) and the provision management platform 153 over the communication network is provided by way of a communication module 209.

In one embodiment, the DNS query module 201 queries the record database 159 in order to retrieve service records associated with a specified resource or request thereof. Query execution is performed to determine if a specified DNS entry already exists. By way of example, the query module 201 may be implemented as a standard network administration lookup or data retrieval tool, such as the domain information groper (dig) or nslookup. Depending on the implementation, query language is constructed by the DNS query module 201 in accordance with the network protocol (e.g., SIP) and directed to the DNS 155 accordingly for executing the lookup request. It is noted that the query process is carried out by the DNS query module 201 in response to customer supplied input. Requests are received by the DNS query module 201 by way of a user interface to the provision management platform 153 as generated by a user interface module 219. Input may include a specified user friendly domain name, a priority indication or any other data useful for informing the query process against known service records.

In one embodiment, a DNS validation module 203 validates the uniqueness of a specified service record in the record database 159. Also, the DNS validation module 203 validates the uniqueness of a DNS 155. The validation process may include verifying whether or not the DNS 155 has any service records matching the query, confirming IP addresses as resolved with respect to a domain name, determining parent server locations, checking for identical service record entries, performing name verification, determining whether the DNS 155 or records maintained are public or privately held, verifying the serial number of specified resources and devices, validating the existence of domain keys, etc. In addition, the DNS validation module 203 may also perform customer access validation for ensuring a requesting customer is able to access information pertaining to the DNS 155 or various service records maintained by the DNS 155. It is noted that execution of the DNS validation module 203 is performed in connection with execution of a query by the DNS query module 201. Furthermore, the DNS validation module 203 may prevent the modification (e.g., adding, editing or deleting) of a service record based on the results of the determination.

In one embodiment, a DNS modification module 205 enables modification of DNS behavior based on the determined status of the DNS 155 with respect to one more network conditions, customer demand criteria, load sharing parameters, etc. By way of example, the DNS modification module 205 may determine a load share parameter, a failover parameter, or a combination thereof pertaining to the DNS 155. As another example, the DNS modification module 205 may determine a load share percentage allocation to be enacted by the DNS 155 in response to the determined load share or failover parameters. In the case of a load share percentage allocation, this pertains to the means by which the DNS 155 manages the access, allocation, provisioning and deployment of named resources of the target host network 105 responsive to demand and/or network conditions. Under this scenario, the types of allocation for resource provisioning may include load share only execution (equal or percent allocation), failover only (full allocation to the failover server), load share with failover (equal or percent allocation respectively) or failover with load share (equal of percent allocation respectively). It is noted the DNS modification module 205 performs the allocation respective to the data provided in a service record pertaining to a particular resource. By way of example, a service record may be modified (e.g., added or edited) based on the determined load share parameter, the failover parameter, or the combination thereof.

In one embodiment, a route scheduling module 207 specifies a time of entry and/or execution of a modified service record at the DNS 155. Also, the route scheduling module 207 routes a user to a specific resource and schedules provision of said resource in accord with a specified time of entry and/or execution. By way of example, a user input received at the web portal 157 for indicating a date, day and/or time of execution of an added, edited or deleted service record may be received by the route scheduling module 207. Alternatively, the time of execution may be set to immediate, so as to enable immediate modification of operations of the DNS 155 respective to the modified service record. It is noted that the route scheduling module 207 may modify a service record based on the specified time/date of entry, including permitting encoding of the specified time of entry and/or execution (e.g., an execution priority) in a data structure representative of a service record. Also, it is noted that the route scheduling module 207 maintains an execution queue or "route-list" relative to the provided input. The time of entry specified dictates the order and pace at which DNS service record entries are processed by the DNS 155, thereby affecting access to and provisioning of resources of the target host network 105 by a customer. Under this scenario, one customer may be routed to and scheduled for allotment of a resource based on the specified load sharing parameter, failover parameter or combination thereof at one time, while the same resource is provisioned for another customer at a later time.

In one embodiment, a report generation module 213 compiles status information, validation information, query results, time of entry and/or execution data, service record parameters (e.g., server domains, identifiers, IP addresses) and other information acquired by or generated with respect to modules 201-207 and contained within a service record in the record database 159. The report may include various statistics, performance indicators and other data for informing the customer of the operation of the DNS 155 or various resources associated with the target host network 105. It is noted that in certain embodiments, the user interface generated by the user interface module 219 enables the customer to specify one or more reporting features, which are received as input for affecting generation of the report.

In one embodiment, a notification module 209 may be configured to notify a customer of a status or result of a modified service record for impacting operation of a DNS 155. By way of example, the notification module 209 can deliver the notification by way of e-mail, short message service (SMS) or other means. Alternatively, the notification module 209 can render a notification message directly to the customer's user interface, such as via the web portal application 157. The notification may be customized as well, in one embodiment, by way of a notification customization module 211. Customization features provided by the notification customization module 211 may include notification of a percent of current or scheduled allotment or provision of resources, an outage notification, a completion request (e.g., as indicated upon execution of the routing and scheduling module 207) or the like. In certain instances, a defined trigger or alarm notification may also be established via the notification customization module 211 for execution by the notification module 209. It is noted that the notification module 209 may trigger generation of messages via the user interface module 219 when required.

Additionally, in one embodiment, a controller module 217 is configured to regulate the communication processes between the various other modules. For example, the controller module 217 generates the appropriate signals to control the communication module 215 for facilitating transmission of data over the network 141 to which the VoIP 117 or customer IP network 113 may be implemented.

Also, while not shown, various monitoring systems may be accessed by the provision management platform 153 for detecting current data traffic levels, error conditions, data exchange rates, network latencies, resource allocation levels and other conditions associated with the operation of the target host network 105. It is noted that the monitoring systems may provide feedback data to the provision management platform 153 for affecting determination of a load sharing condition, failover condition or other condition of the DNS 155 as well as the various resources of the target host network 105 for which the DNS 155 manages.

Figure 3:
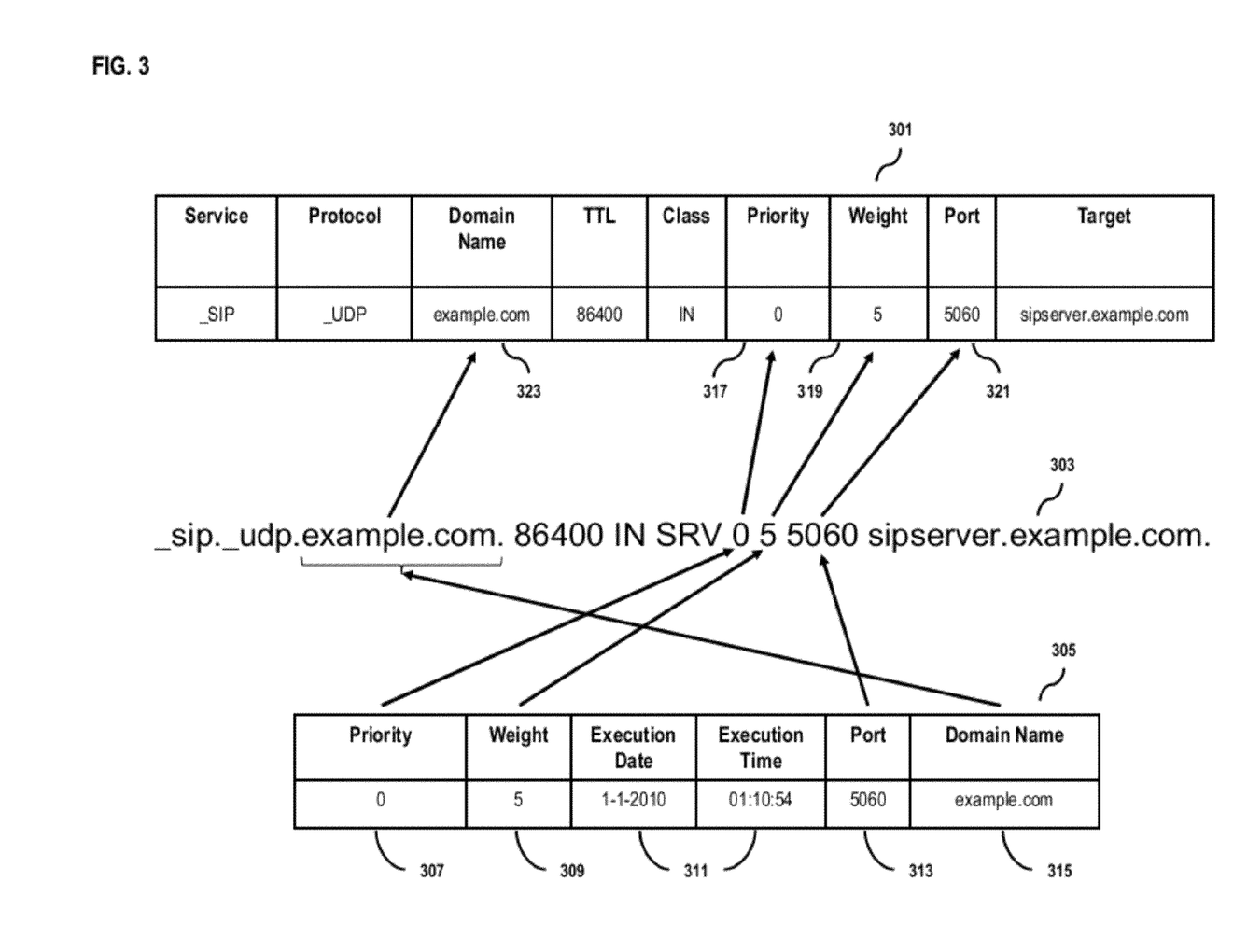
FIG. 3 is a diagram of a data structure maintained by a domain name service of a packetized voice service solution provider for enabling a customer to create a service record, according to various embodiments.

FIG. 3 is a diagram of a data structure maintained by a domain name service of a packetized voice service solution provider for enabling a customer to create a service record, according to various embodiments. As indicated above, a customer at the customer network 103 is able to specify certain fields of the data structure for modifying (editing, adding or deleting) a service record of the DNS 155. The data structure may be constructed for generating a script file, text file or other record for use by the DNS 155. For purposes of illustration, an exemplary data structure 301 and its corresponding format as a service record entry 303 is shown. A typical data structure for a service record may include the following data types:
  service: the symbolic name of the desired service.
  protocol: the transport protocol of the desired service; this is usually either transport control protocol (TCP) or user datagram protocol (UDP).
  domain name: the domain name for which this record is valid.
  TTL: standard DNS time to live field.
  class: standard DNS class field (this is always IN).
  priority: the priority of the target host; a lower value indicates higher priority.
  weight: A relative weight for records with the same priority.
  port: the TCP or UDP port on which the service is to be found.
  target: the canonical hostname of the machine providing the service.

An example service record entry 303 in textual form corresponding to data structure 301 is as follows:
  "_sip._tcp.example.com. 86400 IN SRV 0 5 7060 sipserver.example.com."

It is noted that the order of the data within the data structure 301 may vary depending on the implementation of the DNS 155. Also, certain data types may be input by a customer via the web portal application 157 for affecting compilation of the data structure 301/service record. By way of example, a data structure 305 may be generated based on input received at the web portal application (e.g., by the DNS modification module 205), then utilized subsequently for generating a final data structure 301 for modifying (adding, editing or deleting) a service record. The service record as modified may be associated with a customer account for relating a specific service record for affecting operation of the DNS 155 with a particular customer. An exemplary user interface for enabling customer input of data is shown, by way of example, with respect to FIG. 4.

Figure 4:
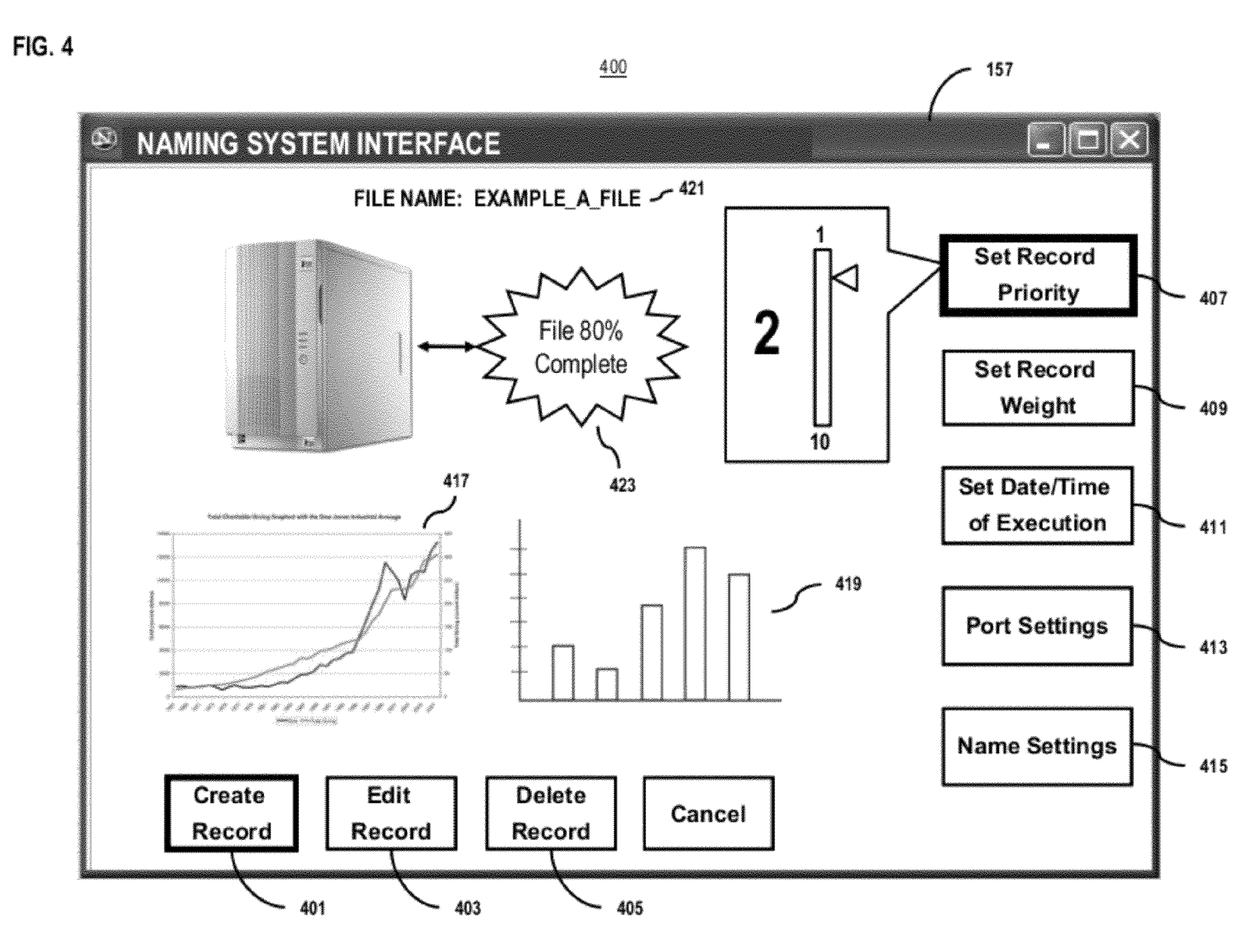
FIG. 4 is a diagram of a user interface for enabling a customer to interact with a domain name service of a packetized voice service solution provider, according to one embodiment.

FIG. 4 is a diagram of a user interface for enabling a customer to interact with a domain name service of a packetized voice service solution provider, according to one embodiment. The customer can create, edit or delete a service record from the interface 400, via a web portal application 157, by selecting one of the service record modification buttons 401, 403 and 405 respectively. In addition, the customer may select one or more data entry modification buttons 407-415 for setting a record priority, record weight, date/time of execution, port setting and name setting respectively. Selection of a button, i.e., the set record priority button 407 by way of example, triggers presentment of a slide bar for enabling the user to modify the priority setting. Alternatively, the user interface 400 as rendered by a web portal application 157 may include various data entry fields, drop down menus or other input means. Each button 407-415 corresponds respectively to elements 307-315 of the input data structure 305, as shown in FIG. 3.

Under this scenario, the customer is allowed to directly control, manipulate or affect a service record and thus operation of the DNS 155 by controlling certain data settings. It is noted that certain fields of the service record and hence, data structure 301 are static while those of the input data structure 305 are controlled via the web portal application 157. By way of this configuration, data elements 307, 309, 313 and 315 of the input data structure 305 are directly mapped to data elements 317-323 of the service record data structure 301. Data elements 311 correspond to the user specified execution date and time of the modified service record, corresponding to execution of the DNS modification module 205 and route scheduling module 207, for controlling execution of the DNS 155. By way of this approach, the customer may pre-schedule resources in advance of an anticipated period of need, such as a holiday or peak business period.

Also, with respect to FIG. 4, the user interface 400 may present various statistics, metrics, graphs 417-419 and other data for indicating the status of a service record or DNS 155, such as in response to the customer input. By way of example, the report generation module 213, notification module 209 and notification customization module 211 may interact with the user interface module 219 to render a completion status indicator 423, various performance graphs 417 and 419, a name of the service record being modified 421, i.e., "Example_A_File" and any other useful data via the web portal application 157.

FIGS. 5A-5D are flowcharts of a process for enabling a customer to provision resources of a packetized voice service solution provider based on one or more conditions, according to various embodiments. For the purpose of illustration, the processes are described with respect to FIG. 1. It is noted that the steps of the process may be performed in any suitable order, as well as combined or separated in any suitable manner. In step 501 of process 500 (FIG. 5A), the provision management platform 153 receives a request for provisioning a domain name service as part of a packetized voice service. As mentioned, the packetized voice service is provided in response to a customer request by a solution provider that maintains a target host network 105. In step 503, the provision management platform 153 generates a prompt via a graphical user interface to obtain information for populating a service record of the DNS 155. In another step 505, the provision management platform 153 generates the service record for storage to a record database 159 corresponding to a customer account for the packetized voice service.

Figure 5A:
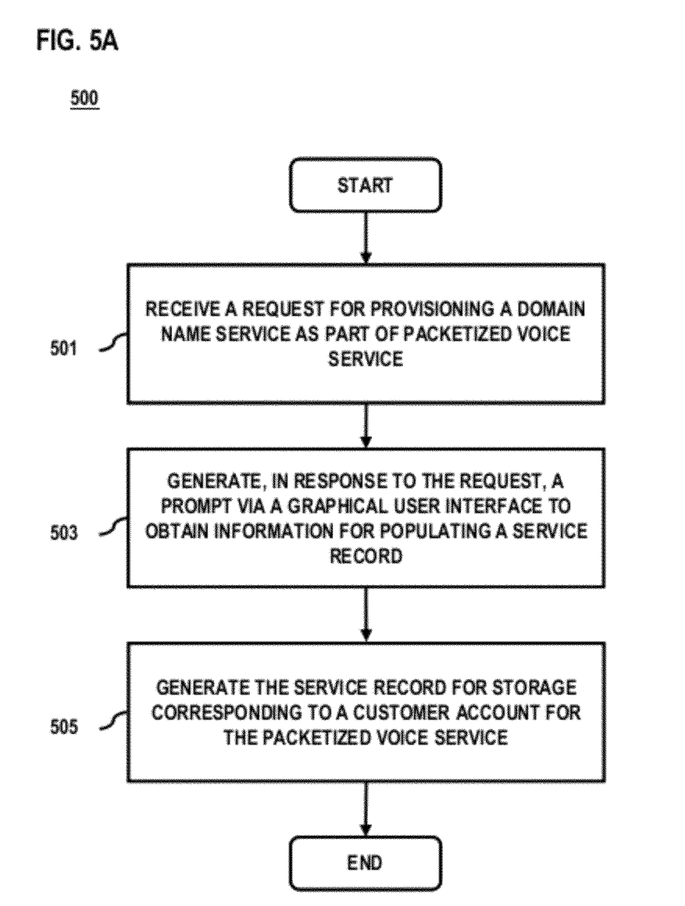
FIGS. 5A-5D are flowcharts of a process for enabling a customer to provision resources of a packetized voice service solution provider based on one or more conditions, according to various embodiments.
Figure 5B:
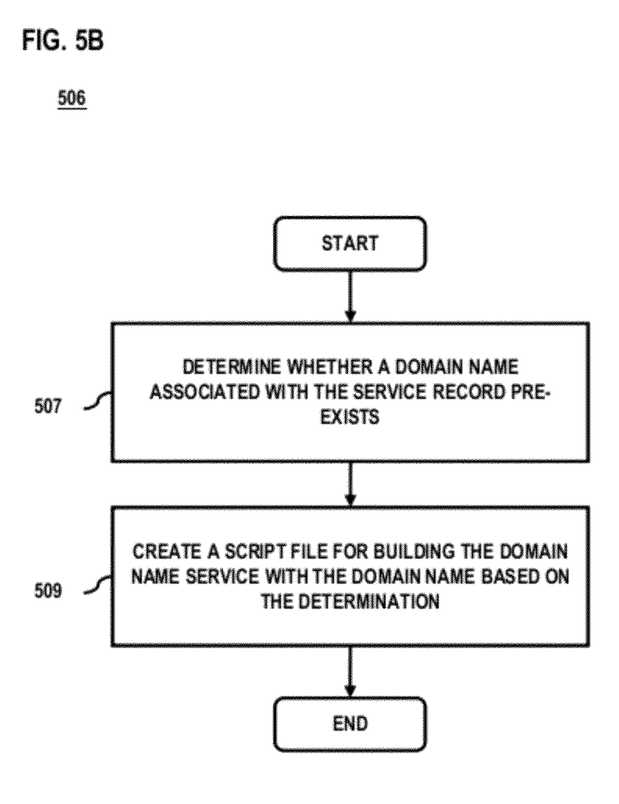
Figure 5C:
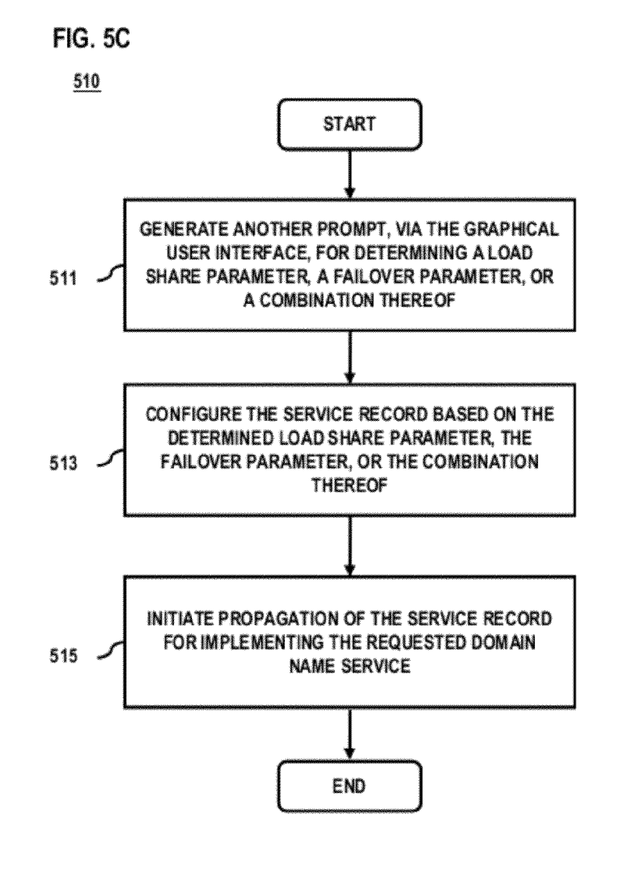
Figure 5D:
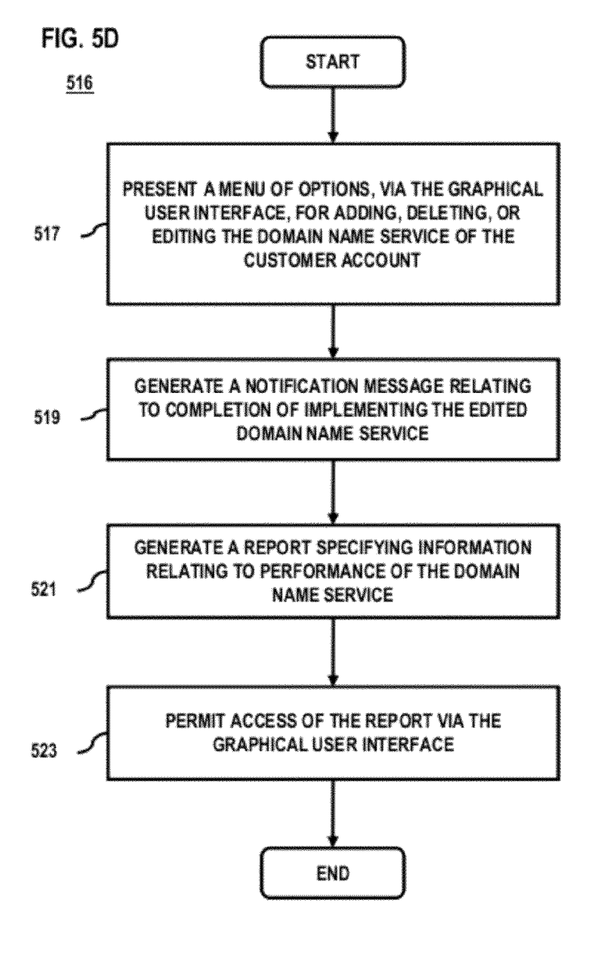

As seen in FIG. 5B, step 507 of process 506 involves the provision management platform 153 determining whether a domain name associated with the service record pre-exists. This execution is performed, for example, by way of the DNS validation module 203 and/or query module 201. The provision management platform 153, as in step 509, creates a script file for building the domain name service with the domain name based on the determination.

In step 511 of process 510 (shown in FIG. 5C), the provision management platform 153 generates another prompt, via the graphical user interface, for determining a load share parameter, failover parameter or a combination thereof. In another step 513, the provision management platform 153 configures the service record based on the determined load share parameter, failover parameter or combination thereof. It is noted that in certain instances this parameter is set to a specific level by a requesting customer, such as by way of the DNS modification module 205. Alternatively, the load sharing and failover parameters may correspond to a threshold setting, which may be compared to a monitored load sharing or failover condition of the DNS 155. In another step 515, the provision management platform 153 initiates propagation of the service record for implementing the requested domain name service.

In step 517 of process 516 (FIG. 5D), the provision management platform 153 causes a user interface of a customer computing device to present a menu of options for adding, deleting or editing the DNS associated with the customer account. In step 519, the provision management platform 153 generates a notification message relating to completion of implementing the edited DNS 155. This execution is performed, by way of example, by the notification module 209 of the provision management platform 153. In another step 521, the provision management platform 153 generates a report specifying information relating to performance of the DNS 155. The performance may pertain to various statistics, graphs, metrics and the like for indicating the operation of the DNS 155 respective to the modified service record. In another step 523, the provision management platform 153 permits access to the report via the graphical user interface of the customer computing device, i.e., as presented via the web portal application 157.

Figure 6:
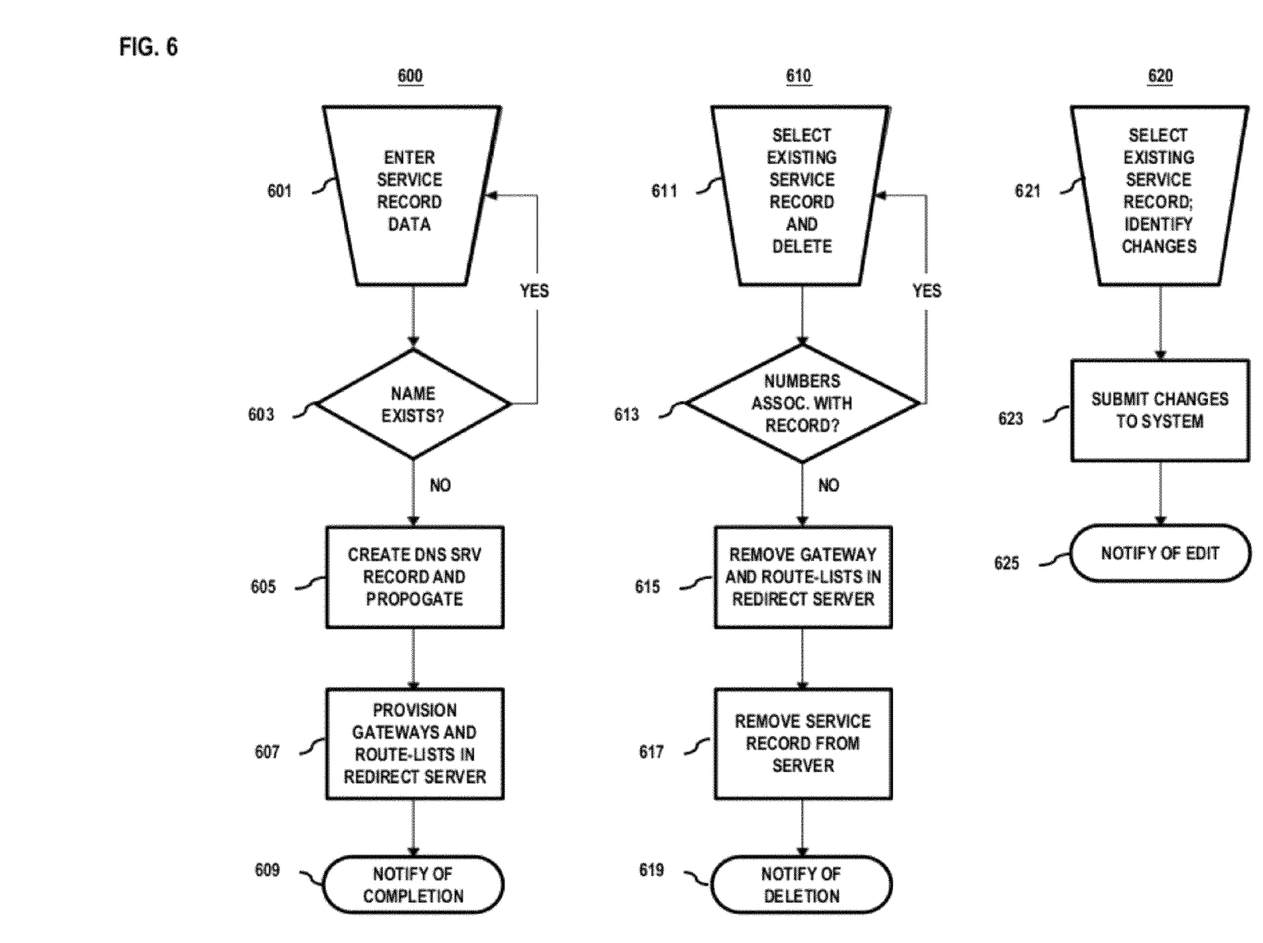
FIG. 6 is a flowchart of processes for enabling a customer to add, edit or delete a service record of a domain name service for controlling the provisioning resources of a packetized voice service solution provider, according to one embodiment.

FIG. 6 is a flowchart of processes for enabling a customer to add, edit or delete a service record of a domain name service for controlling the provision resources of a packetized voice service solution provider, according to one embodiment. As mentioned, modification of a service record corresponds to a modified execution of the DMS 155 for provisioning one or more resources of the target host network 105 on behalf of a customer. In a first modification process 600 for adding a service record, steps 601-609 correspond respectively to entering service record data 601, determining if the entered name pre-exists, creating a DNS service record and propagating the record to the DNS 155, affecting operation of the DNS 155 to affect the provisioning of gateways and route-lists of the target network 105 in the redirect server (e.g., DNS 155) and notifying the customer of completion of the addition.

In a second modification process 610 for deleting an existing service record, steps 611-619 correspond respectively to selecting the existing service record data and deleting it, determining if there are specific IP addresses and other data associated with the deleted record, removing the current provisioning of gateways and route-lists of the target network 105 in the redirect server (e.g., DNS 155), removing the service record from the DNS 155 and notifying the customer of deletion of the record.

In a third modification process 620 for editing an existing service record, steps 621-625 correspond respectively to selecting an existing service record and identify specific changes, submitting the changes to the DNS 155 including provisioning of gateways and route-lists, and notifying the customer of editing of the record. It is noted that all of the above described modification processes may be performed at the discretion of a customer from a graphical user interface.

The exemplary technique and systems presented herein enable a customer to access the resources of a packetized voice communication solution provider conveniently from a web portal application. In addition, the customer may customize the time of execution of resources as well as how the resources may be provisioned for their use. The approaches herein enable any customer to readily gain access to resources they need to meet the demands of their own customer's telecommunication needs.

The processes described herein for provisioning, via a customer interface, packetized voice communication services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
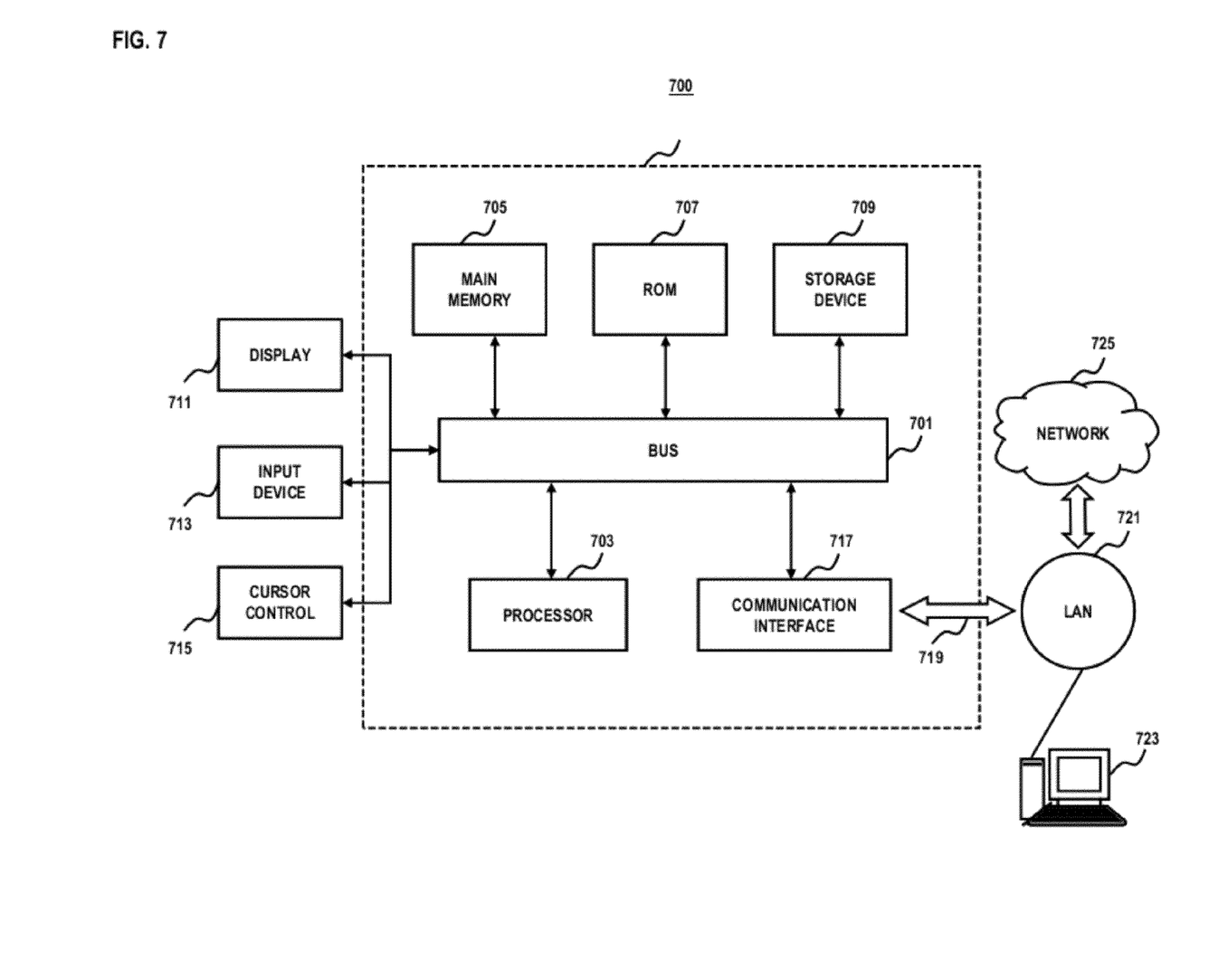
FIG. 7 is a diagram of a computer system that can be used to implement various exemplary embodiments.

FIG. 7 is a diagram of a computer system that can be used to implement various exemplary embodiments. The computer system 700 includes a bus 701 or other communication mechanism for communicating information and one or more processors (of which one is shown) 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for adjusting cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 5, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 8:
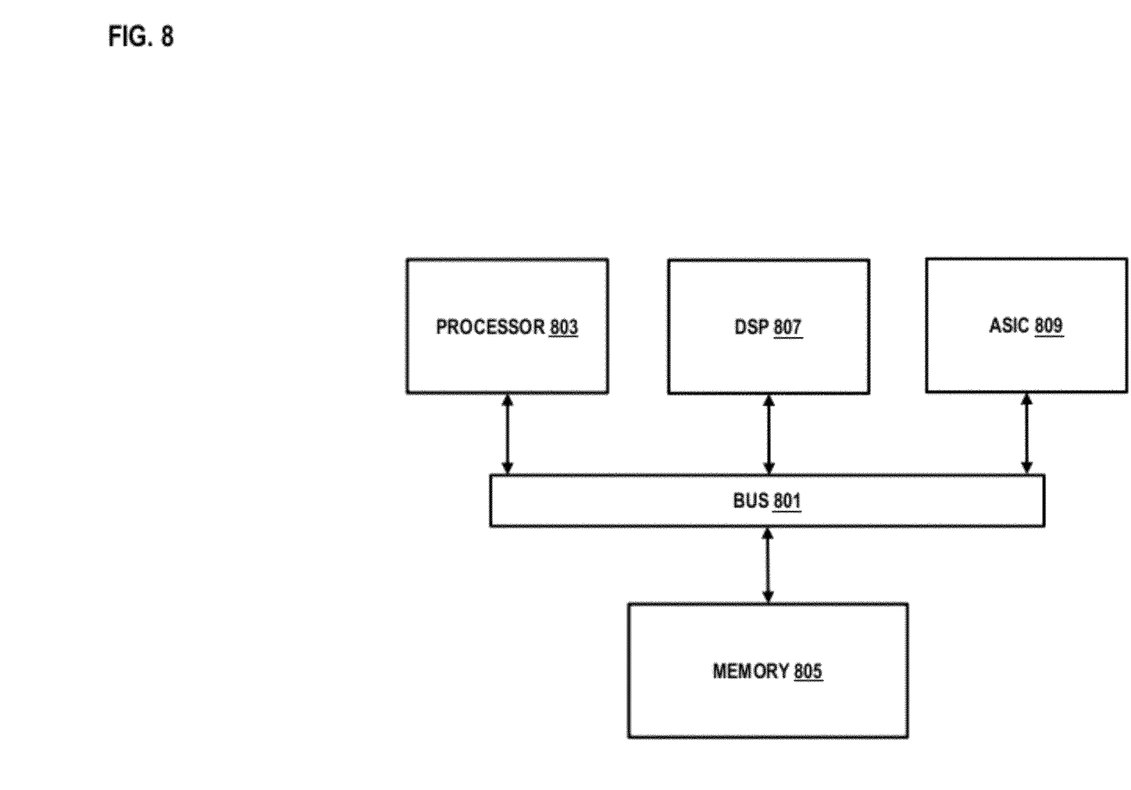
FIG. 8 is a diagram of a chip set that can be used to implement various exemplary embodiments.

FIG. 8 illustrates a chip set 800 upon which an embodiment of the invention may be implemented. Chip set 800 is programmed to present a slideshow as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of FIGS. 5 and 6.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 805 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving a request at a first packetized voice service provider from a second packetized voice service provider for provisioning a domain name service of the first packetized voice service provider as part of a packetized voice service of the second packetized voice service provider;
   generating, in response to the request, a prompt via a graphical user interface to obtain information for populating a service record including,
      a priority field specifying priority information of a target host associated with the domain name service,
      a weight field specifying weighting information for load balancing with respect to the target host, and
      a domain name field specifying a domain name;
   generating statistical data associated with the domain name service for presentation at the graphical user interface, in response to the obtained information, wherein the statistical data includes performance indicators informing a customer of various resources associated with the first packetized voice service provider;
   generating the service record for storage corresponding to a customer account for the packetized voice service;
   modifying, by the customer with the graphical user interface, the domain name service according to the statistical data; and
   generating another prompt, via the graphical user interface, for determining the load share parameter, the failover parameter, or a combination thereof; and
   configuring the service record based on the determined load share parameter, the failover parameter, or the combination thereof.

2. A method according to claim 1, further comprising:
   determining whether the domain name pre-exists;
   creating a script file for building the domain name service with the domain name if the domain name is not a pre-existing domain name; and
   generating another prompt via the graphical user interface to obtain another domain name if the domain name pre-exists.

3. A method according to claim 1, wherein the service record further includes,
   a timing field specifying date and time for execution of the domain name service for the domain name; and
   a port field specifying identification of a port on the target host to utilize for the domain name service.

4. A method according to claim 1, wherein the graphical user interface is provided to the second packetized voice service provider via a web portal as a customer interface for managing the domain name service of the first packetized voice service provider.

5. A method according to claim 1, further comprising:
   presenting a menu of options, via the graphical user interface, for adding, deleting, or editing the domain name service of the customer account.

6. A method according to claim 5, further comprising:
   generating a notification message relating to completion of implementing the edited domain name service.

7. A method according to claim 1, further comprising:
   initiating propagation of the service record for implementing the requested domain name service.

8. A method according to claim 1, further comprising:
   generating a report specifying information relating to performance of the domain name service; and
   permitting access of the report via the graphical user interface.

9. An apparatus comprising:
   at least one processor; and
   at least one memory including computer program code for one or more programs,
   the at least one memory and the computer program code configured to, with the at least one processor, cause the apparatus to perform at least the following,
      receive a request at a first packetized voice service provider from a second packetized voice service provider for provisioning a domain name service of the first packetized voice service provider as part of a packetized voice service of the second packetized voice service provider;
      generate, in response to the request, a prompt via a graphical user interface to obtain information for populating a service record including,
         a priority field specifying priority information of a target host associated with the domain name service,
         a weight field specifying weighting information for load balancing with respect to the target host, and
         a domain name field specifying a domain name;
      generate statistical data associated with the domain name service for presentation at the graphical user interface, in response to the obtained information, wherein the statistical data includes performance indicators informing a customer of various resources associated with the first packetized voice service provider;
      generate the service record for storage corresponding to a customer account for the packetized voice service;
      modify, by the customer with the graphical user interface, the domain name service according to the statistical data;
      generate another prompt, via the graphical user interface, for determining the load share parameter, the failover parameter, or a combination thereof; and
      configure the service record based on the determined load share parameter, the failover parameter, or the combination thereof.

10. An apparatus according to claim 9, wherein the apparatus is further caused to:
   determine whether the domain name pre-exists;
   create a script file for building the domain name service with the domain name if the domain name is not a pre-existing domain name; and
   generate another prompt via the graphical user interface to obtain another domain name if the domain name pre-exists.

11. An apparatus according to claim 9, wherein the service record further includes,
   a timing field specifying date and time for execution of the domain name service for the domain name; and
   a port filed specifying identification of a port on the target host to utilize for the domain name service.

12. An apparatus according to claim 9, wherein the graphical user interface is provided to the second packetized voice service provider via a web portal as a customer interface for managing the domain name service of the first packetized voice service provider.

13. An apparatus according to claim 9, wherein the apparatus is further caused to:
   present a menu of options, via the graphical user interface, for adding, deleting, or editing the domain name service of the customer account.

14. An apparatus according to claim 13, wherein the apparatus is further caused to:
   generate a notification message relating to completion of implementing the edited domain name service.

15. An apparatus according to claim 9, wherein the apparatus is further caused to:
   initiate propagation of the service record for implementing the requested domain name service.

16. An apparatus according to claim 9, wherein the apparatus is further caused to:
   generate a report specifying information relating to performance of the domain name service; and
   permit access of the report via the graphical user interface.

17. A system comprising:
   a web portal of a first packetized voice service provider, wherein the web portal is configured to provide a customer interface for a wholesale packetized voice service of a second packetized voice service provider; and
   a domain name service platform coupled to the web portal, wherein the web portal is configured to receive a request via the first packetized voice service provider from the second packetized voice service provider for provisioning a domain name service of the first packetized voice service provider as part of the wholesale packetized voice service of the second packetized voice service provider, and to present a prompt to obtain information for populating a service record including,
      a priority field specifying priority information of a target host associated with the domain name service,
      a weight field specifying weighting information for load balancing with respect to the target host, and
      a domain name field specifying a domain name,
   wherein the domain name service platform is configured to:
      generate statistical data associated with the domain name service for presentation at a graphical user interface, wherein the statistical data includes performance indicators informing a customer of various resources associated with the first packetized voice service provider; and
      in response to the obtained information, generate the service record for storage corresponding to a customer account for the packetized voice service and modify, by the customer with the graphical user interface, the domain name service according to the statistical data,
   wherein the web portal is further configured to generate another prompt, via the graphical user interface, for determining the load share parameter, the failover parameter, or a combination thereof, and
   wherein the domain name service platform is further configured to configure the service record based on the determined load share parameter, the failover parameter, or the combination thereof.

18. A system according to claim 17, wherein the domain name service platform is further configured to determine whether the domain name pre-exists, to create a script file for building the domain name service with the domain name if the domain name is not a pre-existing domain name, to generate another prompt via the graphical user interface to obtain another domain name if the domain name pre-exists, and to propagate the service record for implementing the requested domain name service.

* * * * *